May 24, 1960  D. M. JOHNSON  2,937,826
MEANS FOR ALTERING THE LEADING EDGE SHAPE OF AN AIRFOIL
Filed Nov. 18, 1955  4 Sheets-Sheet 1

INVENTOR.
DONN M. JOHNSON
BY Dwight L. Moody
ATTY.

May 24, 1960 D. M. JOHNSON 2,937,826
MEANS FOR ALTERING THE LEADING EDGE SHAPE OF AN AIRFOIL
Filed Nov. 18, 1955 4 Sheets-Sheet 3

INVENTOR.
DONN M. JOHNSON
BY Dwight L. Moody
ATTY.

May 24, 1960 D. M. JOHNSON 2,937,826
MEANS FOR ALTERING THE LEADING EDGE SHAPE OF AN AIRFOIL
Filed Nov. 18, 1955 4 Sheets-Sheet 4

INVENTOR.
DONN M. JOHNSON
BY Dwight L. Moody
ATTY.

2,937,826
MEANS FOR ALTERING THE LEADING EDGE SHAPE OF AN AIRFOIL

Donn Martin Johnson, Akron, Ohio, assignor to The B. F. Goodrich Company, New York, N.Y., a corporation of New York Filed Nov. 18, 1955, Ser. No. 547,664

7 Claims. (Cl. 244—44)

The invention relates to means for altering the aerodynamic characteristics and shapes of airfoils, and especially to inflatable coverings for altering the curved shape of the leading edges of airfoils.

High-speed aircraft such, for example, as military jet-powered fighter or interceptor airplanes capable of flying at speed near or in excess of the speed of sound (760 miles per hour at sea level), have required long runways or landing strips for landing and take-off purposes due to their high landing and take-off speeds of about 150 miles or more per hour. Known expedients such as wing slats and landing flaps and the like for reducing the speed of the aircraft by changing the aerodynamic characteristics of the wings have not been wholly satisfactory when applied to the thin section, high-speed type of wings used on the military airplanes.

It has also been proposed heretofore to utilize a pneumatically or a mechanically operated device for changing temporarily the basic shape and for extending the camber and the chord of the wing, especially at its leading edge, so as to alter the wing profile or contour from that of a high-speed, low-lift type to that of a relatively low-speed high-lift type. These devices likewise have not been wholly satisfactory or suitable because of their cumbersome and complicated mechanisms and construction, or undue weight, or unreliability of operation, or other related reasons.

An object of the invention is to provide improved means for altering effectively the basic curved shape of the leading edge and increasing the chord of an airfoil so as to change the lift and speed characteristics of the airfoil, while avoiding the disadvantages and difficulties of the foregoing prior devices.

Other objects of the invention are to provide means for inflatably changing the cross-sectional shape or contour of the leading edge of an airfoil; to provide for reducing effectively the normal landing and take-off speeds and distances of an airplane having relatively thin wings with sharp leading edges, while permitting the wings to function as high-speed wings in normal flight; to provide for preventing the "air-slicing" effect of sharp leading edges of thin wings; to provide for improved smoothness of ambient airflow over the airfoil or wing; to provide for protecting the leading edges of such thin wings against ice accumulation and against damage as from sand, dirt, rain, hail, snow and sleet; to provide for inflatably increasing the length of the chord or median line of an airfoil and for increasing the radius of curvature of the immediate leading edge portion of the airfoil; to provide for a smooth continuation of the cambered surface forwardly and also downwardly beyond the normal leading edge center line; and to provide for simplicity of construction, convenience of manufacture and installation, thinness and lightweight, and for effectiveness of operation.

More specific objects of the invention are to provide an integral or unitary, one-piece, inflatable covering capable of reshaping or altering the basic curved shape of the leading edge of an airfoil, whereby the lift and speed characteristics of the airfoil are changed; to provide an integral inflatable covering which in the uninflated condition, produces little or no change in the normal shape and camber of the leading edge, but which in the inflated condition, presents an external, smoothly curved surface in continuation of and merging tangentially with the upper convexly curved side or cambered surface of the leading edge of the airfoil and also in continuation of and merging gradually with the under side or thrust surface of the leading edge of the airfoil; to provide for an all-over, cemented-down attachment of the unitary inflatable covering to the airfoil; to provide for resisting spanwise ridging, lifting and localized bulging of the external surface of the adhesively attached covering, especially at its highly distensible area and its lower rearward area; to provide for differential stretching of adjacent portions of the covering; to provide for resisting blowout of the inflated covering together with distributing the inflating stresses throughout the major part of the width of the covering; and to provide for increased weather-resistance and continuity of smoothness of the exposed external surface of the covering including its attaching margins.

These and other objects and advantages of the invention will be apparent from the following description.

In the accompanying drawings which form a part of this specification and in which like numerals are employed to designate like parts throughout the same.

In the illustrative embodiment of the invention shown in Figs. 1 to 5, inclusive, a pair of molded, integral or unitary i.e. one-piece, inflatable coverings, one 10 having a left-hand arrangement of its parts and the other 11 having a right-hand arrangement of its parts, are mounted fully cemented-down, as by a suitable rubber cement of the air-curing type, across and at the sides of the thin, sharp leading edges of airfoils or wings 12 and 13, respectively, of a military jet-powered fighter airplane 14. These inflatable coverings 10 and 11 each includes differentially stretchable surface means and inflatable means capable of controlling the flow of air over the wings by virtue of variably altering the basic curved shape in cross-section of each of the leading edges of the wings 12, 13 as by lengthening the camber downwardly and forwardly and increasing the radius of curvature of the leading edges together with increasing the chord of the wings, as shown especially in Fig. 5. Thus, they change the normal aerodynamic characteristics of each of the wings from those of a high-speed, relatively low-lift airfoil to those, for example, of a low-speed, relatively high-lift airfoil as for reducing the landing and take-off speeds and distances of the airplane 14 and, if desired, as for avoiding high-speed stall of the airplane, while it is maneuvering at high speed at high altitudes. Since the construction of each of the unitary inflatable coverings 10 and 11 is the same, except for the left and right-hand arrangement of parts only the covering 10 will be described in detail.

The inflatable protective covering 10 extends spanwise along the leading edge of the wing desirably from its inboard end to substantially its outboard end, and is desirably tapered in plan spanwise to accommodate the variation in thickness and curvature of the leading edge. The covering 10 has an elongated, thin, sheet-like, flexible body 15 including elastic material such, for example, as natural or synthetic rubber, or other rubber-like or elastomeric material having substantially similar chemical composition or physical properties to natural rubber and to equivalents therefor, and capable of undergoing, under appropriate influences such as heat, pressure and the action of a chemical substance, a change from an essentially plastic flowable condition to a relatively firmer or harder, more elastic and resilient condition, and capable of resistance to pitting, abrasion, weather, sunlight, ozone and the like. The flexible elastic body 15 constituting differentially stretchable surface means, is desirably made of a resilient, natural rubber composition and has a relatively inextensible or stretch-resisting, reinforcing base 16 of square-woven, straight-laid, rubberized cotton fabric such, for example, as thin, lightweight, single thickness, balloon cloth coated or impregnated on both sides with a thin layer of natural rubber composition for bonding and attaching purposes. This reinforcing fabric base 16 constituting the inner or attaching surface of the covering 10 extends continuously from spanwise margin 17 to spanwise margin 18 and from chordwise margin 19 to chordwise margin 20 of the covering 10, and advantageously facilitates a secure, all-over, cemented-down attachment of the covering 10 with its inner surface throughout the entire area thereof secured in immovable relationship to the wing 12 by means of a suitable rubber cement. This avoids requiring the venting of air from beneath the covering and a screw attachment at the margins. Also, the base 16, since it is integrally bonded to the rubber material of the body 15, promotes the desired differential stretch functioning of adjacent portions of the covering 10. The construction is such that the greater extent of this stretching occurs rearwardly of the intersection of the wing chord median line 28 with the longitudinal center line 28b of the leading edge (which latter center line 28b extends perpendicularly to the planes of Figs. 4 and 5), and said greater stretching occurs substantially wholly at the under side of the leading edge. The covering-positioning line 28a extending spanwise along the body 15 and spaced from the margins 17, 18 corresponds to and coincides with the leading edge center line 28b, when the covering 10 is mounted upon the leading edge of the wing 12.

The body 15 has a thin, protective outer layer or surface 21 extending continuously between all the margins 17, 18, 19, 20 for direct exposure to the ambient air in the mounted condition of the covering 10, which outer surface 21 may be about 0.010 inch thick and made of elastic neoprene, a polymer of isoprene namely 2-chlorobutadiene, characterized by its stretchability and its resistance to pitting, abrasion, aging, cracking and other deterioration from rain, sleet, ice, sunlight and weather.

Figures 1, 2, 3:
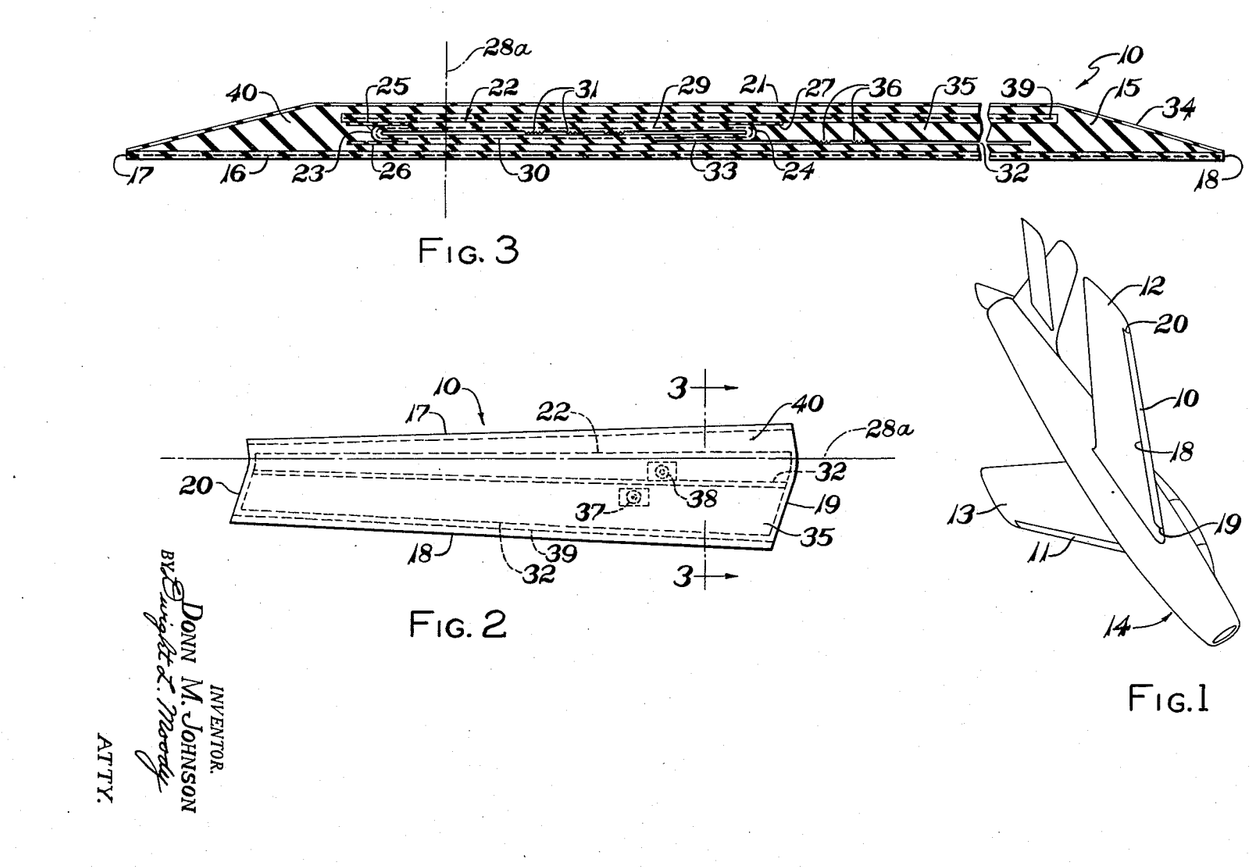
Fig. 1 is a perspective view from below of an inflatable covering on the leading edge of each wing of a jet-powered fighter airplane, and constructed in accordance with and embodying the invention.
Fig. 2 is a plan view from above of the inflatable covering as molded and vulcanized for mounting on the left-hand wing as viewed from the front of the airplane.
Fig. 3 is a cross-sectional view in an enlarged scale of the inflatable covering taken along line 3—3 of Fig. 2, parts being broken away.

In the body 15 between its inextensible fabric base 16 and its stretchable neoprene outer surface 21 and nearest yet slightly spaced from the base 16, is disposed means forming at least one inflatable tubular element or elongated tube 22 with its thin, continuous annular wall including highly stretchable, impervious, elastic material. Preferably, the inflatable tube 22 is made of single thickness, tricot fabric of known nylon filamentary material which fabric has a thin, impervious coating of natural rubber on both sides. The nylon tricot fabric is arranged axially and circumferentially continuous in the inflatable tube and in such a manner as to be extensively stretchable circumferentially thereof to facilitate maximum inflating distension of the covering 10. The nylon material is, for example, a polyamide of adipic acid and hexylenediamine.

Figure 4:
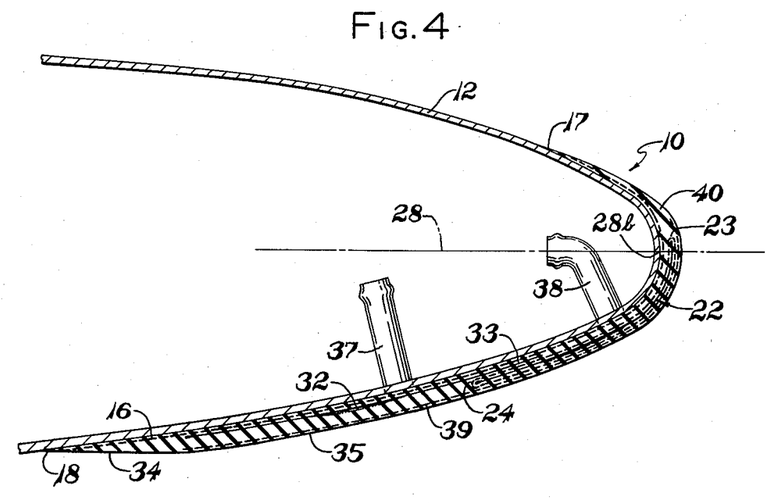
Fig. 4 is a cross-sectional view showing the inflatable covering installed on the leading edge of the wing, parts being broken away.

The inflatable tube 22, when deflated, has outer and inner wall portions 29 and 30, respectively, each of which lies flat within the body 15, that is, substantially parallel to the fabric base 16, as shown in Figs. 3 and 4, with each side marginal portion 23, 24, respectively, of the tube arranged in a single, relatively flattened, curved fold, all of which portions are preferably bonded to the adjacent resilient, natural rubber material of the body. However, the lower side marginal portion 24 and narrow rearward zones of the outer 29 and inner 30 wall portions need not be bonded to the adjacent rubber of the body thereby facilitating extensive outward and rearward distension of the tube in its rearward region. The outer wall portion 29 may have one or more thin, longitudinal, ridged venting strips 31, 31 of natural rubber bonded to its inner face at the central region thereof to prevent sealing of the wall portion 29 against the inner wall portion 30 and for local stiffening and anti-ridging purposes.

Immediately overlying and underlying the folded upper side marginal portion 23 in overlapping bonded relation thereto and extending laterally beyond such portion 23 into the rubber body material, are a pair of reinforcing tapes 25 and 26, respectively, of rubber coated, thin, single thickness, cotton balloon cloth or fabric for tear-resistance and strength purposes and for preventing the formation of an external, longitudinal bead or ridge in the covering at its surface overlying the portion 23. For the particular construction shown in Fig. 3, a single, suitable reinforcing tape 27 is bonded to and overlies and overlaps the other or lower folded side marginal portion 24 of the tube 22 and extends laterally therefrom as for preventing an external, longitudinal bead in the neoprene outer surface 21 of the covering at the portion 24.

Figure 5:
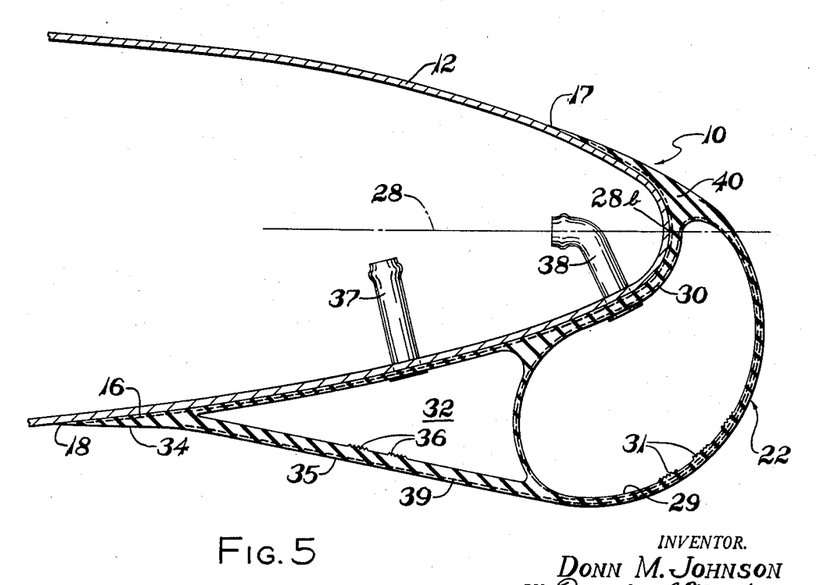
Fig. 5 is a view like Fig. 4 but showing the installed covering inflated.

The inflatable tube 22 may be of tapered form, that is, of gradually decreasing diameter from the inboard end toward the outboard end of the covering, and is disposed offset laterally in the covering, that is, positioned nearer to the upper spanwise margin 17 than it is to the lower spanwise margin 18. When the covering 10 is mounted upon the leading edge with the covering-positioning, spanwise line 28a coinciding with the leading edge, spanwise center line 28b, as shown in Figs. 4 and 5, the tube 22 is located unsymmetrically relative to the leading edge center line 28b and has its side marginal portion 23 disposed to the upper side of but close to and preferably spaced from the leading edge center line 28b. Thus, the marginal portion 23 is located at a position in the immediate leading edge region and short of the upper limit or boundary of the normal stagnation zone at the immediate leading edge. However, the remainder or major part of the tube 22 extends laterally or chordwise across and then below or to the lower side of the leading edge center line 28b i.e. it is disposed substantially wholly along the under side or thrust surface of the leading edge of the wing. This particular disposition of the inflatable tube 22 relative to the spanwise line 28a and to the center line 28b is important and essential for good results. The spacing between the spanwise line 28a and the upper marginal portion 23 of the tube 22 is uniform spanwise and, for example, may be from about ½" to about ¼" depending upon the size of the leading edge.

Upon inflation of the tube 22 in the mounted covering, the outward distension of the tube relative to the leading edge of the wing takes place starting from a position entirely within the stagnation zone and only slightly above the leading edge center line 28b and extending chordwise downwardly from the latter position across the center line and then wholly along the under side of the leading edge. Thus, the controlled forward and outward movement or distension of the tube 22, especially its highly stretchable outer wall portion 29 and side marginal portions 23, 24, is confined in minor part to the immediate leading edge region i.e. the part of sharpest curvature or smallest radius of curvature in the leading edge, and in major part to the region rearwardly therefrom wholly along the under side of the leading edge, as shown especially in Fig. 5. This produces an increase in the chord length and in the camber and a less sharply curved or relatively bluntly rounded sectional profile of the leading edge of the wing, with the major change in curved shape occurring below the leading edge center line 28b at the under side of the leading edge.

An individual air chamber 32 capable of mutual coaction with the inflatable tube 22, is provided within the resilient rubber material of the body 15 at a position therein slightly spaced above the inextensible fabric base 16 but below the position of the inflatable, extensible nylon tube 22, as shown especially in Fig. 3, and extends longitudinally continuous coextensive with the length of the tube 22 and extends laterally rearward away from the tube 22. The individual air chamber 32, in the "as molded" and also deflated condition of the covering 10, is characterized by its slit-like configuration in the body 15, the resilient rubber material in said body 15 being divided intermediate the thickness thereof and providing an impervious, stretchable, annular wall surface defining the air chamber. In the deflated condition of the covering, the air chamber 32 has a narrow zone 33 (about one-fourth the width of the deflated tube 22) which extends laterally forward beneath and overlaps the rearward or lower side marginal portion 24 and a rearward minor part of the inner wall portion 30 of the inflatable tube 22 to facilitate maximum freedom of circumferential stretching of the portions 24 and 30 in the tube 22. The wall of the tube at its lower marginal portion 24 constitutes a highly stretchable impervious partition separating and preventing communication between the tube 22 and the air chamber 32. The remainder of the air chamber 32 extends laterally rearward away from the tube 22 to substantially the thin, gradually tapered, marginal portion 34 of the body 15 at the rearward spanwise margin 18 of the covering 10 to provide for a rearwardly and gradually tapered, elongated sectional shape of the air chamber 32 in the inflated mounted condition of the covering 10, as shown in Fig. 5.

This construction and arrangement of the body 15 including the individual air chamber 32 rearward of the inflatable tube 22 provides in the covering 10 a stretchable, rearward fairing portion 35, the relatively thick outer wall (overlying the chamber 32) of which stretches extensively laterally and swings pivotally about the margin 18 and outwardly away from the base 16 including the relatively thin, rubber, inner wall underlying the chamber 32, when the tube 22 inflates. Thus, the fairing portion 35 functions to effect a controlling influence upon the inflated tube in respect of its sectional shape and to produce a smooth configuration rearwardly of the inflated tube 22, as shown in Fig. 5, and to reduce the drag of the wing. The relatively wide, lower fairing portion 35 may be provided at its outer wall, which constitutes part of the said wall surface of the air chamber 32, with one or more longitudinal ridged venting strips 36, 36 of natural rubber positioned in the inner face of said outer wall. These strips 36 prevent sealing of the outer wall of the portion 35 against the inner wall thereof underlying the air chamber 32, and also stiffen and reinforce to a limited degree the said outer wall of the portion 35 so that it resists longitudinal localized bulges or beads in the outer surface of the covering, especially when the latter is deflated and lies against the leading edge.

When the tube 22 is inflated with air at, for example, about 15 lbs. per square inch, the individual air chamber 32 may be maintained at atmospheric or zero pressure, or it may be maintained under a slight inflating pressure of, for example, about 1.5 to 2 lbs. per square inch as for stiffening the fairing portion's 35 outer wall against objectionable flabbiness and distortion and to further facilitate maintaining the desired smooth faired configuration at the rearward region of the covering. When the tube 22 is deflated, the air chamber 32 is maintained under suction i.e. less than atmospheric pressure. To these ends, the air chamber 32 in the mounted covering 10 is in communication with a suitable tubular fitting 37 mounted on the covering 10 and within the leading edge of the wing, as shown in Figs. 4 and 5, the fitting being arranged for connection as may be required to the atmosphere, a source of air under pressure (not shown), and a source of suction (not shown). Likewise, the inflatable tube 22 in the mounted covering 10 is in communication with a suitable tubular fitting 38 mounted on the covering and within the leading edge, and arranged for connection to the source of air under pressure, and desirably to the source of suction.

The invention provides a thin, highly stretchable, sheet-like, stress-resisting reinforcement 39 of suitable nylon tricot fabric thinly coated on both sides with natural rubber, which reinforcement is desirably, but not necessarily limited to a single thickness of tricot fabric; since it may have a multiple thickness of tricot fabric for increased resistance to ridging of the outer surface of the covering. The reinforcement 39 is embedded within the natural rubber composition of the body 15 at a position slightly spaced from and beneath the thin neoprene outer layer 21 but above and immediately at the outer wall portion 29 of the inflatable tube 22, as shown especially in Fig. 3. The nylon reinforcement 39 is arranged to be highly stretchable laterally, that is, chordwise of the covering, and extends continuously spanwise substantially to the chordwise margins 19 and 20 of the covering. The nylon reinforcement 39 extends continuously chordwise in the covering, as shown in Fig. 3, from a position in advance of and spaced from the front or upper side marginal portion 23 of the tube 22 and desirably substantially spaced from the tapered part of the upper spanwise margin 17 to a position at the tapered part of the lower spanwise margin 18 of the covering, that is the nylon reinforcement 39 fully overlies the tube 22 and air chamber 32 and occupies substantially the entire body area which has uniform thickness and is located between the tapered parts of the margins 17, 18 of the covering, which thickness may be, for example, about $\frac{3}{16}$ inch for the molded covering 10.

The nylon reinforcement 39 is another of the important features of the covering, because it prevents blowout of the tube 22 and sustains in part the inflating stresses and transmits and distributes these stresses especially to the stretchable rearward fairing portion 35 in the covering to promote uniformity of stretching in the outer wall of the portion 35. Also, it further resists the formation of localized spanwise ridges rearwardly of the tube 22 by increasing the stiffness or distortion-resistance of the fairing portion 35. It advantageously facilitates the desired particular distended shape and predominately downward and rearward bulging of the inflated tube 22 and the desired streamlined sectional contour of the body 15, as shown in Fig. 5, and the desired greater stretching of the body 15 in its intermediate frontal area overlying the inflatable tube 22 as compared to that in its adjacent rearward area overlying the air chamber 32.

The nylon reinforcement 39 being entirely surrounded by and bonded to adjacent resilient rubber in the body 15, effects limited yieldable resistance to and limited control of the inflating distension of the tube 22, whereby the greatest outward distension of the tube 22 is downwardly and also predominately rearwardly relative to the leading edge center line 28b, and predominately outward away from the underside of the leading edge. The relatively minor outward and forward distension of the tube 22 immediately at the leading edge center line 28b and in the stagnation zone of the leading edge, is preferably only sufficient to result in the distended covering 10 extending the cambered surface of the wing smoothly forward and downward, hence increasing the camber, and also to result in the outer surface of the distended covering 10 tangentially intersecting and smoothly merging with the cambered surface of the leading edge at the upper spanwise margin 17 of the covering, as shown in Fig. 5.

The elastic body 15 including the fabric base 16 and the neoprene outer layer 21 therein has an upper solid stretch-resisting or second fairing portion 40, in part of uniform thickness and in part gradually tapered to a thin edge, that is flaring from a minimum thickness upon the upper side of the airfoil to a maximum thickness at a position in the immediate leading edge of the airfoil closely adjacent the upper limit of the stagnation zone of the leading edge when the covering is mounted as shown in Fig. 4. Thus, the fairing portion 40 is arranged for extending laterally or chordwise away from the upper side marginal portion 23 of the inflatable tube 22 to the upper spanwise margin 17 of the covering and, for the mounted condition of the covering, extending over the upper side or cambered surface of the leading edge. The upper or second fairing portion 40 is relatively narrow as compared to the lateral extent or width of the first or lower fairing portion 35 of the covering, and includes elastic rubber overlying the base 16 and secured thereto and to the upper marginal portion of the tube 22, as shown in Fig. 3, and freely stretchable (that is, not restrained by any attaching screws and the like extending therethrough) upon inflating distension of the tube, as shown in Fig. 5. The solid upper fairing portion has a lesser quantity of stretchable rubber material and a substantially lesser extent of and relatively limited stretchability as compared to that of the covering at the inflating tube 22 and the first or lower fairing portion 35. This facilitates maintaining the tube 22 in position relative to the center line 28b with little or no lateral shifting of the tube as a whole toward the lower side of the center line 28b under inflation of the tube.

The upper fairing portion 40 has sufficient width, that is, chordwise extent, to merge smoothly and conform with the cambered surface rearwardly of the immediate leading edge region to avoid disturbing the laminar flow of ambient air, when the covering in its mounted condition is deflated and conforms to the leading edge curvature. Also, it is essential that this width of the upper fairing portion 40 be sufficient relative to the width and position and distensibility of the tube 22 to provide for a curved outer surface 21 at such portion 40 which is not only in continuation of and merges smoothly (without abrupt, localized change in curvature) with the curved outer surface 21 of the covering at the inflated tube 22, especially at its distended upper side marginal portion 23, as shown in Fig. 5; but which is also in continuation of and merges tangentially and smoothly with the upper side or cambered surface of the leading edge at the upper spanwise margin 17, whereby the cambered surface, by virtue of the inflated covering 10, is extended forwardly and its continuous curvature maintained forwardly and downwardly relative to the leading edge centerline 28b for continuity of non-turbulent airflow over the leading edge and cambered surface of the wing, while the chord is also increased.

The fabric and rubber parts of the covering 10 are integrally united as by vulcanization under heat and pressure, and the covering may be molded in flat form and subsequently flexibly conformed and all-over adhesively attached to the leading edge of the wing. The covering, as shown in Fig. 4, is simply mounted flush against the continuous metal skin of the leading edge.

The covering 10 has provision of three contiguous, spanwise-extending zones or portions each of a different degree of stretchability with the greatest stretchability in the intermediate zone or portion at the inflatable tube 22, the next greatest stretchability in the rearward lower zone at the lower fairing portion 35 and the air chamber 32, and the least stretchability in the rearward upper zone at the upper fairing portion 40. When the covering 10 is adhesively attached to the thin, sharp leading edge of the wing 12 having, for example, the contour or profile of the N.A.C.A. 64A010 airfoil section which is symmetrical about the chord line, as shown in Figs. 4 and 5, the covering-positioning line 28a of the covering coincides with the chord line or leading edge center line 28b, whereby the inflatable tube 22 has its upper side marginal portion 23 slightly and uniformly chordwise spaced from and disposed to the upper side of the center line 28b, and hence located at the part of smallest radius of curvature of the leading edge, that is, the immediate leading edge, and short of the upper limit of the stagnation zone of the leading edge. Although there can be limited tolerance in the described chordwise spacing of the upper side marginal portion 23 relative to the leading edge center line 28b for the mounted condition of the covering without undue harm to the desired altered profile of the leading edge, it is important for best results that said marginal portion 23 be located within a range of positions from a position slightly above the center line 28 to a position at the center line 28b, but not at a position substantially below the center line 28b. Such positioning will produce the desired partially forward but predominately downward and rearward inflating distension of the tube 22 relative to the immediate leading edge and to the under side of the leading edge, and the desired smooth tangential merging of the distended covering's outer surface 21 with the upper or cambered surface of the leading edge, together with continuous smooth curvature of the outer surface 21 of the distended covering across or chordwise along the upper fairing portion 40 and the tube 22, as shown especially in Fig. 5.

When the elongated tube 22 in the mounted covering 10 inflates at about 15 lbs. per square inch pressure, substantial lateral shifting of the tube 22 relative to the leading edge center line 28b is resisted effectively by the chordwise acting, elastic restraining influence of the upper fairing portion 40 due in part to the fabric base 16 and the lesser stretchability of the rubber material constituting the portion 40. However, there is sufficient elastic give or stretch in the upper fairing portion 40 to permit limited outward and forward distension of the tube 22 in its upper side marginal portion 23 and the small part of the outer wall portion 29 adjacent thereto, thereby facilitating the increase in camber and chord of the wing and the smooth tangential merging of the outer surface 21 of the distended covering with the cambered surface of the leading edge.

The remainder or major part of the outer wall portion 29, the lower side marginal portion 24, and that part of the inner wall portion 30 overlying the air chamber 32, together with the rubber material of the body 15 and the nylon tricot reinforcement 39 therein overlying the tube 22, all stretch extensively circumferentially of the said tube, while the said portions 29, 24 and 30 thereof distend outwardly and downwardly away from the underside of the leading edge. The outer wall portion 29 also bulges outwardly in part forwardly but predominately downwardly and rearwardly relative to the under side of the leading edge with the greatest extent of outward bulging occurring at the rearward region of the tube 22, as shown in Fig. 5.

The stretchable rubber outer wall including the nylon reinforcement 39 therein of the lower fairing portion 35 stretches chordwise a substantial amount and pivotally swings outwardly about the rear margin 18 and relative to the underside of the leading edge upon inflation of the tube 22, while at the same time effecting a limited yet elastic, chordwise restraining influence through the nylon reinforcement 39 upon the outward bulging of the tube 22. This facilitates the predominately downward and rearward distension of the tube 22 and produces a smoothly and gradually sloping rearward outer surface of the covering which merges with the under side of the leading edge. Such functioning of the fairing portion 35 occurs whether the air chamber 32 be under zero pressure or under about 2 lbs. per square inch pressure, the presence of the latter pressure in the air chamber serving largely to increase the stiffness of the flexible stretchable outer wall of the fairing portion 35 to prevent localized, spanwise ridges in the outer surface of the fairing portion.

While the tube 22 is inflated, the covering 10 retains the streamlined contoured profile about the leading edge of the wing, thereby not only increasing the radius of curvature of the immediate leading edge which is presented to the ambient air but also increasing the camber forwardly and downwardly and increasing the chord of the wing, all of which produce a relatively low-speed, high-lift type of wing profile making feasible reduced landing and take-off speeds and distances of the airplane and shorter runways at airfields. Repetitive inflation and deflation of the covering through a predetermined cycle has been found to effectively remove ice deposits as they form on the leading edge, and thus further increase the safety of the airplane.

Upon deflation of the tube 22 and applying suction thereto and to the air chamber 32, the covering elastically returns to full conformance with the leading edge, as shown in Fig. 4, and in this condition resists the formation of localized spanwise ridges in its outer surface at the tube 22 and the lower fairing portion 35.

Figure 6:
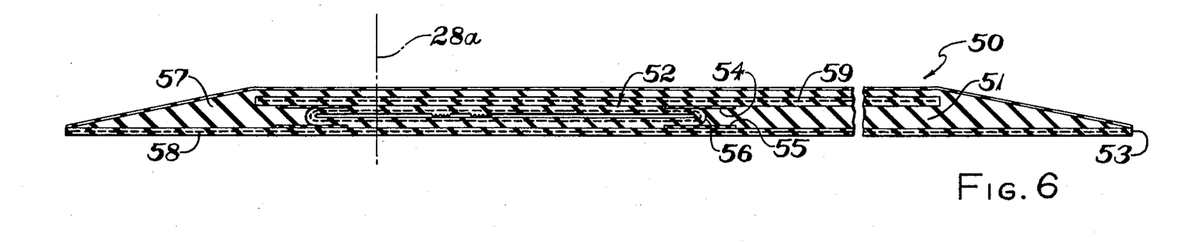
Fig. 6 is an enlarged sectional view like Fig. 3 but showing a first modified construction of the inflatable covering, parts being broken away.
Figure 7:
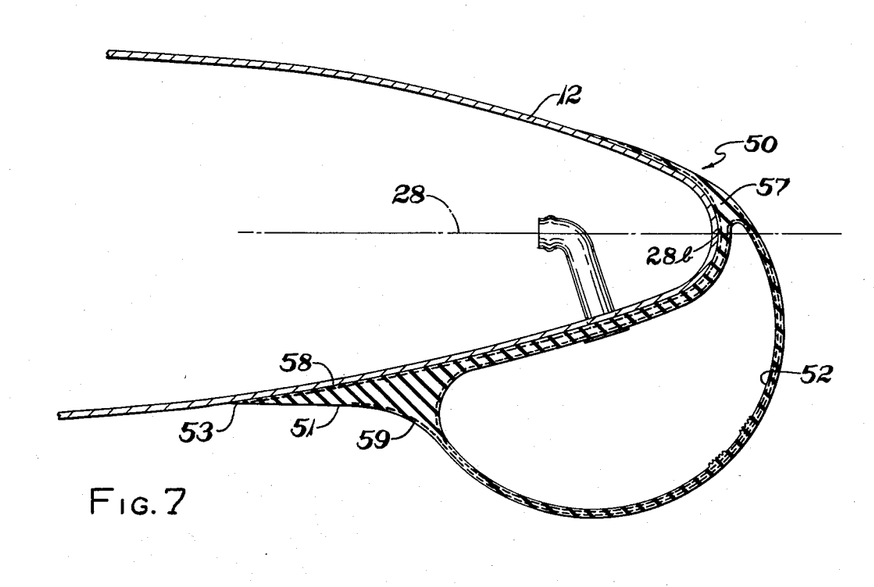
Fig. 7 is a view like Fig. 5 but showing the installed said first modified covering inflated.

The first modified construction 50 of the inflatable covering shown in Figs. 6 and 7, is like that of the covering 10, except that the inflatable covering 50 eliminates an individual air chamber in its lower fairing portion 51 extending rearwardly away from its inflatable tube 52 toward spanwise-extending lower margin 53. The integral lower fairing portion 51 is of reduced width or chordwise length as compared to that of the lower fairing portion 35 in the covering 10, but of greater width than upper fairing portion 57 of the covering 50. The inflatable covering 50 has a pair of suitable fabric tape strips 54, 55, respectively, bonded to and overlying and underlying the lower side marginal portion 56 of the inflatable tube 52, whereby all parts of the tube 52 are continuously bonded to the adjacent resilient rubber material in the body of the covering. The covering 50 includes a suitable fabric base 58 and has a suitable continuous, nylon tricot fabric reinforcement 59 in its tube 52 area and in its lower fairing portion 51, as shown in Fig. 6.

When the modified covering 50 is mounted upon the leading edge of the wing in the manner of the covering 10 with the inflatable tube 52 in the same relationship to the leading edge center line 28b as compared to that of the inflatable tube 22 in the covering 10, inflation of the tube 52 at about 15 lbs. per square inch air pressure outwardly distends the covering 50 forwardly and downwardly to a curved shape resembling generally that of the inflated covering 10 and shown in Fig. 7. The wall of the inflated tube 52 stretches circumferentially and the tube distends not only outwardly but predominately downwardly and rearwardly relative to the leading edge center line 28 and predominately at the under side of the leading edge. A minor and limited amount of the outward distension is in the direction forwardly of the immediate leading edge.

However, the rear region of the tube 52, being fully bonded to adjacent resilient rubber material in the integral covering 50, has less freedom to outwardly bulge relative to the under side of the leading edge and produces a relatively lesser magnitude of outward bulging as compared to that of the tube 22, because in part of the absence of an individual air chamber such as the chamber 32 and because in part of the relatively greater elastic chordwise restraint provided by the lower fairing portion 51 to such bulging of the tube 52. Since the lower fairing portion 51 is integral and not divided by an elongated slit intermediate its thickness, the inflation of the tube 52 compels stretching and elastic deformation of the rubber material overlying the base 58 and compels elastic chordwise stretching of the reinforcement 59 in the portion 51 such that the outer surface of the lower fairing portion 51 curves first in continuation of the outer curvature at the rear region of the tube 52 and then curves smoothly in a faired manner toward and to the underside of the leading edge at the lower margin 53.

The inflated covering 50, as shown in Fig. 7, has its curved outer surface merging smoothly and tangentially with the upper cambered surface of the leading edge for smoothness of ambient airflow over the wing, and produces the desired increase in camber forwardly and downwardly of the leading edge and increase in chord, and the desired yet different change in profile of the leading edge, all of which are effective to increase the lift of the airfoil.

Figure 8:
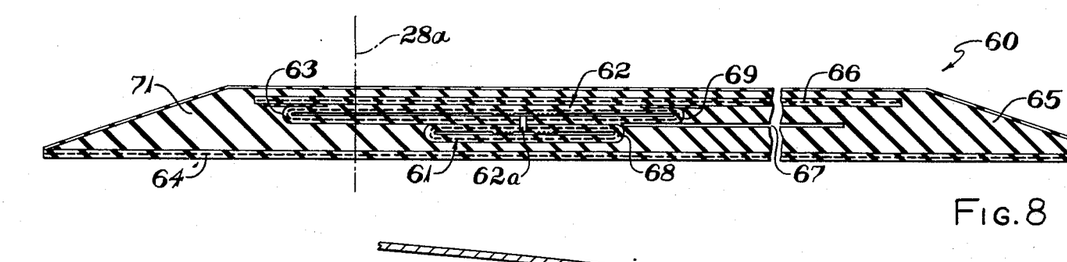
Fig. 8 is an enlarged sectional view like Fig. 3 but showing a second modified construction of the inflatable covering, parts being broken away.
Figure 9:
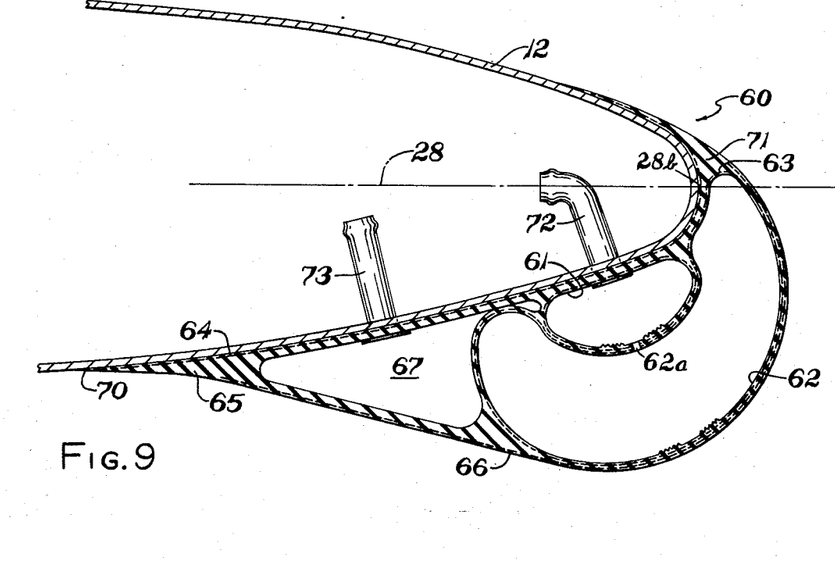
Fig. 9 is a view like Fig. 5 but showing the installed said second modified covering inflated.

The second modified construction 60 of the covering shown in Figs. 8 and 9 is like the construction of covering 10 except that a small diameter inflatable tube 61 and a large diameter inflatable tube 62 arranged in superimposed contacting relationship one to the other, are provided in the covering 60 for effecting increased outward distension of the covering, especially at the underside of the leading edge. The small tube 61 may be of uniform diameter throughout its length and may have its longitudinal axis slightly offset laterally to the rear of the longitudinal axis of the large tube 62 so that the small tube 61 is disposed wholly below the leading edge center line 28b and wholly at the under side of the leading edge for the mounted condition of the covering. The small tube 61 may be about one-half (½) the diameter of the large tube 62 and is located directly below the large tube 62 and slightly spaced above the fabric base 64 of the covering. The upper side marginal portion 63 of the large tube 62 is located to the upper side of and uniformly spaced from the leading edge center line 28b similar to the positioning of the marginal portion 23 of the tube 22 relative to the center line 28b for the mounted condition of the covering.

The lower fairing portion 65 of the covering 60 is provided, intermediate its thickness and between the fabric base 64 and the stretchable nylon tricot reinforcement 66, with a slit-like individual air chamber 67 substantially like the air chamber 32. The air chamber 67 extends laterally rearward away from the lower side marginal portion 68 of the small tube 61 and along and beneath the lower side marginal portion 69 of the large tube 62 and toward the rear spanwise margin 70 of the covering 60. The upper fairing portion 71 of the covering 60 has sufficient lateral extent or width to provide the desired smooth, tangential merger of the outer surface of the inflated covering with the cambered surface of the leading edge of the wing.

For effecting inflation of the small 61 and the large 62 diameter tubes, the adjacent superimposed walls of the tubes have a common aperture 62a therethrough, and a suitable inflating fitting 72 like the fitting 38 is connected to and in communication with the small tube 61. A suitable fitting 73 like the fitting 37 is connected to and in communication with the individual air chamber 67 for suction and inflating purposes.

When the covering 60 is mounted upon the leading edge and the two tubes 61, 62 are inflated at 15 lbs.

per square inch air pressure, the small tube 61 is first and initially, at least, fully distended outwardly thereby facilitating the subsequent full inflation of the large tube 62 and the elastic stretching of substantially the entire wall thereof so that the tube 62 is ultimately distended outwardly and predominately downwardly and rearwardly along the under side of the leading edge. The upper fairing portion 71 and lower fairing portion 65 and air chamber 67 coact and function in substantially the same manner as the corresponding parts in the covering 10 under inflation of the tubes in the covering 60 to facilitate provision of the desired altered leading edge profile shown in Fig. 9.

The respective illustrative embodiments of the invention shown in the drawings are advantageously of thin, molded, integral or unitary, one-piece, elastic construction, and are lightweight. They require a minimum of operating equipment and do not necessarily require a recess or other structural change in the normal shape and construction of the leading edge or of the airfoil as a whole, and constitute relatively simple means of controlling the flow of air over airplane wings. They are conveniently cemented down, i.e., all-over adhesively attached to the leading edge, reliable in operation, and can be inflated by automatic or by manual control, and are easily serviced and replaced, when necessary.

Flight tests of the inflatable covering 10, for example, on a fullsize, jet fighter airplane of a particular design or model have shown that use of the covering 10 during the landing and takeoff phases results in a reduction of approximately 15 percent in the landing speed and of approximately 10 percent in the take-off speed of the airplane with a corresponding reduction of nearly one-third in the landing distance and nearly one-fifth in the take-off distance. However, it will be understood that foregoing data will vary to a limited degree depending upon the particular model airplane to which the covering 10 is applied. The covering need not be inflated and used in normal flight, and has little or no effect on normal flight speeds. However, it can be inflated during high altitude acrobatics of the airplane to avoid high altitude stalls thus enhancing the safety of the airplane. These results are not only new and useful but highly important in the operation of high-speed airplanes, especially military fighter and interceptor airplanes; and show that the improved inflatable covering overcomes effectively the problem of increasing the lifting power of thin, high-speed wings or airfoils having sharp leading edges which, at low speeds, "slice" into the ambient air causing the air to separate from the top or cambered surfaces of the wings and swirl and become turbulent, rather than flowing smoothly over the cambered surfaces. This slicing and separation of the air and resilient turbulent flow of air over the cambered surface reduces the maximum lifting capability of the wing, and is prevented by the mounted covering in its inflated condition on the leading edge.

Variations may be made without departing from the scope of the invention as it is defined in the following claims.

I claim:

1. Apparatus of the class described comprising an airfoil having a leading edge with a cambered upper side and an under side, in combination with an integral sheet-like inflatable covering of elastic material disposed across and at the sides of said leading edge with the inner surface of the covering throughout the entire area thereof adhesively secured in immovable relationship to said airfoil, said inflatable covering comprising a first integral fairing portion of elastic material flaring from a minimum thickness upon said upper side of the airfoil to a maximum thickness at a position in the immediate leading edge of said airfoil closely adjacent the upper limit of the stagnation zone of said leading edge, the said fairing portion merging in its region of maximum thickness with integral thin wall portions defining an inflatable chamber, the inner of said thin wall portions comprising a part of said inner surface of the covering secured to the airfoil, said thin wall portions extending rearwardly along the under side of the leading edge of said airfoil with the thin wall portions united to each other and to a second inflatable fairing portion of elastic material at a position rearwardly spaced from the longitudinal center line of said leading edge of the airfoil, means in communication with said inflatable chamber for conducting inflating fluid under pressure to and from said chamber, and second means in communication with said second inflatable fairing portion for admitting fluid thereto and exhausting fluid therefrom, the said second inflatable fairing portion extending rearwardly from the first-mentioned inflatable chamber along the under side of the airfoil and terminating in an elastic rearwardly tapered solid marginal portion of the covering remote from said longitudinal center line of the leading edge, the outer surface of the outer of said thin wall portions and the outer surface of said first fairing portion forming a smoothly continuous convexly curved surface in the region of their merger with said outer surface of said first fairing portion continuing from such region rearwardly along the cambered upper side of the airfoil and being smoothly tangential to the airfoil when said covering is inflatably distended with the said inflation occurring predominately at said under side of the airfoil.

2. Apparatus of the class described comprising an airfoil having a leading edge with a cambered upper side and an under side, in combination with an integral sheet-like inflatable covering of elastic material disposed across and at the sides of said leading edge with the inner surface of the covering throughout the entire area thereof adhesively secured in immovable relationship to said airfoil, said inflatable covering comprising a first integral fairing portion of elastic material flaring from a minimum thickness upon said upper side of the airfoil to a maximum thickness at a position in the immediate leading edge of said airfoil closely adjacent the upper limit of the stagnation zone of said leading edge, the said fairing portion merging in its region of maximum thickness with integral thin wall portions defining an inflatable tubular element having its upper margin adjacent but short of said upper limit of the stagnation zone, the inner of said thin wall portions in said element comprising a part of said inner surface of the covering secured to the airfoil, said thin wall portions extending rearwardly along the under side of the leading edge of said airfoil with the thin wall portions united to each other and to outer and inner wall portions of an inflatable fairing portion of elastic material at a position rearwardly spaced from the longitudinal center line of said leading edge of the airfoil, means in communication with said inflatable tubular element for conducting inflating fluid under pressure to and from said element, and second means in communication with said inflatable fairing portion for admitting fluid thereto and exhausting fluid therefrom, the said inflatable fairing portion extending rearwardly from said inflatable tubular element along the under side of the airfoil and being of substantially greater rearward extent than that of said first fairing portion and terminating in an elastic rearwardly tapered solid marginal portion of the covering, the inner wall portion of said inflatable fairing portion comprising a part of said inner surface of the covering secured to the airfoil, and a stress-distributing reinforcement of elastically stretchable fabric embedded in elastic material nearest the outer surface of the covering and extending continuously from substantially said upper margin of the inflatable tubular element in overlying relation to and entirely across the outer of said thin wall portions in said inflatable tubular element and rearwardly therefrom intermediate the thickness of the outer wall portion of and entirely across said inflatable fairing portion to said rearwardly tapered marginal portion, the outer surface of the covering at said upper margin of the inflatable tubular element and the outer surface of said first fairing portion forming a smoothly continuous convexly curved surface in the region of their merger with said outer surface of said first fairing portion continuing from such region rearwardly along the cambered upper side of the airfoil and being smoothly tangential to the airfoil when said covering is inflatably distended with the said inflation occurring predominately at said under side of the airfoil.

3. Apparatus of the class described comprising an airfoil having a leading edge with a cambered upper side and an under side, in combination with an integral sheet-like inflatable covering of elastic material disposed across and at the sides of said leading edge with the inner surface of the covering throughout the entire area thereof adhesively secured in immovable relationship to said airfoil, said inflatable covering comprising a first integral fairing portion of elastic material flaring from a minimum thickness upon said upper side of the airfoil to a maximum thickness at a position in the immediate leading edge of said airfoil closely adjacent the upper limit of the stagnation zone of said leading edge, the said fairing portion merging in its region of maximum thickness with integral thin wall portions defining a single chamber inflatable tubular element with its upper margin adjacent but short of said upper limit of the stagnation zone of the leading edge, the inner of said thin wall portions in said element comprising a part of said inner surface of the covering secured to the airfoil, said thin wall portions extending rearwardly along the under side of the leading edge of the airfoil with the thin wall portions united to each other and to an inflatable fairing portion of elastic material at a position rearwardly spaced from the longitudinal center line of said leading edge of the airfoil, a first means in communication with said inflatable tubular element for conducting inflating air under pressure to and from said element, the said inflatable fairing portion extending rearwardly from said single chamber inflatable tubular element along the under side of the airfoil and being of substantially greater rearward extent than that of said first fairing portion and terminating in an elastic rearwardly tapered solid marginal portion of the covering, said inflatable fairing portion including an elastically stretchable outer wall portion and an inner wall portion united to the said outer and inner thin wall portions of said inflatable tubular element and united to each other at said rearwardly tapered marginal portion, said inner wall portion of said inflatable fairing portion comprising a part of said inner surface of the covering secured to said airfoil, and a second means in communication with said inflatable fairing portion for conducting air to and from the latter, the outer surface of the covering at said upper margin of the inflatable tubular element and the outer surface of said first fairing portion forming a smoothly continuous convexly curved surface in the region of their merger with said outer surface of said first fairing portion continuing from such region rearwardly along the cambered upper side of the airfoil and being smoothly tangential to the airfoil when said single chamber inflatable tubular element in the covering is inflatably distended with the said inflation occurring predominately at said under side of the airfoil.

4. Apparatus of the class described comprising an airfoil having a leading edge with a cambered upper side and an under side, in combination with an integral sheet-like inflatable covering of elastic material disposed across and at the sides of said leading edge with the inner surface of the covering throughout the entire area thereof adhesively secured in immovable relationship to said airfoil, said inflatable covering comprising a first integral fairing portion of elastic material flaring from a minimum thickness upon said upper side of the airfoil to a maximum thickness at a poistion in the immediate leading edge of said airfoil closely adjacent the upper limit of the stagnation zone of said leading edge, the said fairing portion merging in its region of maximum thickness with integral thin wall portions defining a single chamber inflatable tubular element with its upper margin adjacent but short of said upper limit of the stagnation zone of the leading edge, the inner of said thin wall portions in said element comprising a part of said inner surface of the covering secured to the airfoil, said thin wall portions extending rearwardly along the under side of the leading edge of the airfoil with the thin wall portions united to each other and to an inflatable fairing portion of elastic material at a position rearwardly spaced from the longitudinal center line of said leading edge of the airfoil, a first means in communication with said inflatable tubular element for conducting inflating air under pressure to and from said element, the said inflatable fairing portion extending rearwardly from said single chamber inflatable tubular element along the under side of the airfoil and being of substantially greater rearward extent than that of said first fairing portion, and terminating in an elastic rearwardly tapering solid marginal portion of the covering, said inflatable fairing portion including an elastically stretchable outer wall portion and an inner wall portion united to the said outer and inner thin wall portions of said inflatable tubular element and united to each other at said rearwardly tapered marginal portion, said inner wall portion of said inflatable fairing portion comprising a part of said inner surface of the covering secured to said airfoil, a second means in communication with said inflatable fairing portion for conducting air to and from the latter, and a stress-distributing reinforcement of elastically stretchable fabric embedded in elastic material nearest the outer surface of the covering and extending continuously from substantially said upper margin of said single chamber inflatable tubular element in overlying relation to and entirely across the outer of said thin wall portions of said tubular element and rearwardly therefrom intermediate the thickness of and entirely across said stretchable outer wall portion of said inflatable fairing portion to said rearwardly tapered marginal portion of the covering, the outer surface of the covering at said upper margin of the inflatable tubular element and the outer surface of said first fairing portion forming a smoothly continuous convexly curved surface in the region of their merger with said outer surface of said first fairing portion continuing from such region rearwardly along the cambered upper side of the airfoil and being smoothly tangential to the airfoil when said single chamber inflatable tubular element in the covering is inflatably distended with the said inflation occurring predominately at said under side of the airfoil.

5. An elongated molded integral inflatable covering of elastic material and sheet configuration adapted to be conformed and mounted across and to the cambered upper side and the under side of the leading edge of an airfoil to modify the aerodynamic characteristics thereof, said inflatable covering comprising a first integral unitary fairing portion of elastic material, an inflatable tubular element including a thin outer wall portion and a thin inner wall portion with the said wall portions in substantially parallel relation to each other and to the adjacent surfaces of the said covering and spaced from said surfaces, said outer and inner wall portions being united to each other adjacent the edges thereof with one edge of the tubular element united to the said fairing portion and with the latter portion flaring laterally from a minimum thickness at one longitudinal marginal edge of the covering to a maximum thickness at its region of merger with said tubular element, an inflatable fairing portion united to the other edge of said tubular element and extending laterally away from the latter, said inflatable fairing portion being of substantially greater lateral extent than that of the first-mentioned fairing portion and including outer and inner wall portions of elastic material bounding an inflatable opening throughout such portion extending laterally in spaced substantially parallel relation to the inner surface of the covering and underlying and partially overlapping the adjacent inner wall portion of said tubular element, a laterally tapering elastic solid marginal portion of the covering integral with the said walls of the inflatable fairing portion and extending therefrom to the other longitudinal marginal edge of the covering, means in communication with said inflatable tubular element for conducting inflating fluid under pressure to and from the latter, and means in communication with said inflatable fairing portion to conduct fluid to and from the latter.

6. An elongated molded integral inflatable covering of elastic material and sheet configuration adapted to be conformed and mounted across and to the cambered upper side and the under side of the leading edge of an airfoil to modify the aerodynamic characteristics thereof, said inflatable covering comprising a first integral unitary fairing portion of elastic material, a single chamber inflatable tubular element including a thin outer wall portion and a thin inner wall portion with the said wall portions in substantially parallel relation to each other and to the adjacent surfaces of the said covering and spaced from said surfaces, said outer and inner wall portions being united to each other adjacent the edges thereof with one edge of the tubular element united to the said fairing portion and with the latter portion flaring laterally from a minimum thickness at one longitudinal marginal edge of the covering to a maximum thickness at its region of merger with said tubular element, an inflatable fairing portion united to the other edge of said tubular element and extending laterally away from the latter, said inflatable fairing portion being of substantially greater lateral extent than that of the first-mentioned fairing portion and including outer and inner wall portions of elastic material bounding an inflatable opening throughout such portion extending laterally in spaced substantially parallel relation to the inner surface of the covering and underlying and partially overlapping the adjacent inner wall portion of said tubular element, a laterally tapering elastic solid marginal portion of the said covering integral with the walls of the inflatable fairing portion and extending therefrom to the other longitudinal marginal edge of the covering, an elastic laterally stretchable fabric reinforcement in elastic material nearest the outer surface of said covering and extending laterally from said region of merger to said laterally tapering marginal portion, means in communication with said inflatable tubular element for conducting inflating fluid under pressure to and from the latter, and means in communication with said inflatable fairing portion to conduct fluid to and from the latter.

7. An elongated molded integral sheet-like flexible inflatable covering of elastic material for mounting across and at the sides of the leading edge of an airfoil to modify the aerodynamic characteristics thereof, said inflatable covering comprising a first integral unitary fairing portion of elastic material flaring laterally of the covering from a minimum thickness at one marginal edge of the covering to a maximum thickness at its region of merger with an intermediate portion of the covering of relatively greater lateral extent, said intermediate portion including integral thin wall portions defining an elongated inflatable tubular element extending longitudinally of the covering within said intermediate portion, the inner of said thin wall portions comprising a part of the inner surface of the covering, said thin wall portions extending laterally entirely across said intermediate portion and being united to each other, means in communication with said inflatable tubular element for conducting inflating air under pressure to and from said element, a second fairing portion of elastic material extending laterally of the covering from said intermediate portion to the other marginal edge of the covering, the said second fairing portion having substantially greater lateral extent than that of said first fairing portion, said elastic material of said second fairing portion having a slit-like opening therein intermediate the thickness of the covering extending laterally from a position underlying and spaced from the adjacent margin of said inflatable tubular element to a position in said second fairing portion remote from said element and spaced from said other marginal edge to provide an elongated individual chamber in said second fairing portion having an elastically laterally stretchable outer wall portion and an inner wall portion with the latter wall portions united to the said outer and inner thin wall portions of said inflatable tubular element and united to each other at the said remote position in said second fairing portion, said inner wall portion of said second fairing portion comprising a part of said inner surface of the covering, means in communication with said individual chamber in the second fairing portion for conducting air to and from the latter, a stress-distributing unitary reinforcement of elastically laterally stretchable fabric embedded in elastic material nearest the outer surface of the said covering and extending continuously laterally from substantially said region of merger to a position adjacent and spaced from the said other marginal edge of the covering, and a stretch-resisting unitary reinforcement of woven fabric embedded in elastic material nearest the inner surface of the said covering and extending throughout the length and width of said covering.

References Cited in the file of this patent

UNITED STATES PATENTS

| | | |
|---|---|---|
| 1,942,867 | Leguillon | Jan. 9, 1935 |
| 2,168,328 | Diehl | Aug. 8, 1939 |
| 2,271,760 | Colley | Feb. 3, 1942 |
| 2,306,759 | Sears | Dec. 29, 1942 |
| 2,320,017 | Spicer | May 25, 1943 |
| 2,378,528 | Arsandaux | June 19, 1945 |
| 2,436,889 | Heston | Mar. 2, 1948 |
| 2,504,684 | Harper | Apr. 18, 1950 |